(12) United States Patent
Kim et al.

(10) Patent No.: US 8,437,554 B2
(45) Date of Patent: May 7, 2013

(54) METHOD OF EXTRACTING THREE-DIMENSIONAL OBJECTS INFORMATION FROM A SINGLE IMAGE WITHOUT META INFORMATION

(75) Inventors: Taejung Kim, Seoul (KR); Taeyoon Lee, Incheon (KR)

(73) Assignee: Inha-Industry Partnership Institute, Incheon (KR)

(*) Notice: Subject to any disclaimer, the term of this patent is extended or adjusted under 35 U.S.C. 154(b) by 141 days.

(21) Appl. No.: 13/057,066

(22) PCT Filed: Aug. 3, 2010

(86) PCT No.: PCT/KR2010/005104
§ 371 (c)(1),
(2), (4) Date: Feb. 1, 2011

(87) PCT Pub. No.: WO2011/074759
PCT Pub. Date: Jun. 23, 2011

(65) Prior Publication Data
US 2011/0216962 A1 Sep. 8, 2011

(30) Foreign Application Priority Data
Dec. 16, 2009 (KR) .................. 10-2009-0125439

(51) Int. Cl.
*G06K 9/46* (2006.01)
*G06K 9/66* (2006.01)

(52) U.S. Cl.
USPC ............ 382/190; 348/135; 382/103; 382/154

(58) Field of Classification Search .................. 348/135; 382/103, 154, 190
See application file for complete search history.

(56) References Cited

U.S. PATENT DOCUMENTS

| | | | |
|---|---|---|---|
| 7,376,284 B2 | 5/2008 | Tao et al. | |
| 7,500,391 B2* | 3/2009 | Woro | 73/170.27 |
| 7,536,253 B2* | 5/2009 | Ohba et al. | 701/117 |
| 7,728,869 B2* | 6/2010 | Jung | 348/113 |
| 7,733,342 B2 | 6/2010 | Kim et al. | |
| 7,920,182 B2* | 4/2011 | Jacob et al. | 348/241 |
| 2011/0216962 A1* | 9/2011 | Kim et al. | 382/154 |

FOREIGN PATENT DOCUMENTS

| | | |
|---|---|---|
| KR | 10-0647807 | 11/2006 |
| KR | 10-2007-0054593 | 5/2007 |

OTHER PUBLICATIONS

"Extraction of 3D building information using shadow analysis from single high resolution satellite image", Lee Tae Yoon, Kim Tae Jung, Lim Young Jae, The Journal of the Korean Society for GeoSpatial information system, vol. 14, No. 2, Jun. 2006 pp. 3-13.

(Continued)

*Primary Examiner* — Gregory M Desire
(74) *Attorney, Agent, or Firm* — Wood, Phillips, Katz, Clark & Mortimer

(57) ABSTRACT

Disclosed herein is a method of extracting 3-dimension object information by a shadow analysis from a single image without meta information, and a technical problem to be solved is to extract three-dimension information of an object such as a height of the object and a footprint surface position of the object from a single image without meta information.

7 Claims, 11 Drawing Sheets

OTHER PUBLICATIONS

"A study on reproduction of 3-dimensional building model from single high resolution image without meta information", Lee Tae Yoon, Kim Tae Jung, The Journal of the Korean Society for GeoSpatial information system, vol. 17, No. 3, Sep. 2009. pp. 71-79.

"Generation of 3D building models from commercial image database through shadow analysis", Lee Tae Yoon, Kim Tae Jung, ASPRS 2010 Annual Conference, San Diego, California, Apr. 26-30, 2010.

"Building Detection and Description from a Single Intensity Image", Chungan Lin and Ramakant Nevatiay, Computer Vision and Image Understanding, vol. 72, No. 2, November, pp. 101-121, 1998 Article No. IV980724.

\* cited by examiner

METHOD OF EXTRACTING THREE-DIMENSIONAL OBJECTS INFORMATION FROM A SINGLE IMAGE WITHOUT META INFORMATION

CROSS-REFERENCES TO RELATED APPLICATION

This patent application is a U.S. National Stage Application submitted under 35 U.S.C. 371 of International Application Serial Number PCT/KR2010/005104, filed on Aug. 3, 2010, which claims the benefit of priority under 35 U.S.C. §119 from Korean Patent Application No. 10-2009-0125439 filed Dec. 16, 2009, the contents of which are incorporated herein by reference.

BACKGROUND OF THE INVENTION

1. Field of the Invention

The present disclosure relates to a method of extracting the height of an object and a footprint surface position of the object from a single satellite image or aerial photographs devoid of meta information.

2. Description of the Related Art

Recently, ordinary people also have a chance to approach a high-resolution image map or 3-dimensional building model via the internet. As a representative image map of furnishing such information, Google Earth or the like exist.

When using software called "Sketchup" unfolded by Google, a general person may easily make a 3-dimension building model and put it up on an image map of Google Earth.

Like this, a high-resolution image map and 3-dimension building map generation become of interest to non-experts as well, researches related to 3-dimension building model generation has been conducted from the past. (Jae-Hong Oh et al. 2007; Kwang-Jae Wee et al. 2007; Sung-Hyuk Jung and Jae-Ki Lee, 2008: Bohn, 2004; Frueh et al., 2004; Fruh and Zakhor, 2003; Lafarge et al., 2008; Zhang et al., 2003). Many of the researches focused on a precise building model generation employing various data and a city model generation using this (Kwang-Jae Wee et al, 2007; Sung-Hyuk Jung and Jae-Ki Lee, 2008; Fruh and Zakhor, 2003; Lafarge et al., 2008; Zhang et al., 2003), or performed an experiment put emphasis on a finite building texture generation or an automatic building texture generation (Jae-Hong Oh et al, 2007; Bohn, 2004; Frueh et al., 2004).

On the one hand, representative conventional technology for extracting 3-dimension information of an object may be categorized by these approaches: stereoscopic, multi-sensory and monoscopic.

In general, many applications for extracting three-dimensional information of an object from images may use an approach based on a stereo camera modeling using a stereo image or more images.

Since such a method needs to perform a camera modeling for each image, there is a problem of necessarily obtaining a ground control points for each image, and since there needs to use more than two images, there may be disadvantages such as a comparatively complicated process and high-cost.

Many methods using a single image have used an approach of estimating a height using a length of a vertical line between a roof corner of the object and a footprint corner of the objet or an approach by measuring the length of a shadow.

Herein, a previous method, that is, a method using the length of the vertical line or a method using the length of the shadow, requires meta information and all of the methods require visible footprint of the object. However in complex urban area, some objects have non-visible footprint and the shadow length of some objects that can't be measured in the image.

Connected with this, in 'METHOD FOR EXTRACTION OF 3D BUILDING INFORMATION USING SHADOW ANALYSIS' (Registration Patent 10-0647807, 2006.11.13) overcame the above-described in some part by a method of simulating a vertical line and a shadow of an object and projecting it onto an image by an azimuth and an elevation angle of a light source and a camera.

However, even in this method, there is a problem that meta information such as azimuth and elevation angles of a light source and a camera in those times of photographing the image is necessary.

On the one hand, methods using elevation data such as 'LiDAR' can extract accurate a height of objects, but there are disadvantages such as complex data processing and high-cost.

In short, the above-described prior arts need to use material of high-cost such as LIDAR, two or more images, or, even in a case of using a single image, meta information.

SUMMARY OF THE INVENTION

The present invention has been made to address the above-described disadvantages. The objective of the present invention is to provide a method using only a single image without meta information by estimating information such as an elevation angle and an azimuth of a light source and a camera for a related-use.

To attain this end, the present invention measures a vertical line and a shadow line of an object from the image and estimates an elevation angle and an azimuth of a light source and a camera at image acquisition time.

On the one hand, it is another objective to provide a method of extracting 3-dimension object information only from a single image without meta information in the least by estimating an elevation angle proportion constant which can replace an elevation angle if a Ground Sampling Distance (GSD) or spatial resolution of the image is not provided.

To achieve the above-mentioned object, the present invention includes a first step of inputting a single satellite image or aerial image without meta information, a second step of selecting a reference object from the image inputted through the first step, measuring a vertical line and a shadow line relative to the reference object from the input image and inputting the height of the reference object, a third step of estimating azimuth and elevation angles or elevation angle proportion constants, that can replace the elevation angle, of a camera and a light source using the height inputted, the vertical line and the shadow line measured through the second step, a fourth step of selecting a specific object for finding a footprint position and the height of the object from the inputted image and extracting a roof surface outline of the selected object, a fifth step of adjusting a height value of the object selected, a sixth step of projecting vertical lines and a virtual shadow of the object corresponding to a height value adjusted through the fifth step onto the input image, a seventh step of determining whether the vertical lines or virtual shadow projected through the sixth step matches against the vertical lines or shadow of the input image and an eighth step of extracting a height and a footprint surface outline of the object selected, when determined that the vertical lines and virtual shadow projected through the sixth step matches against the vertical lines and shadow of the input image through the seventh step.

The second step selects the reference object from the image inputted through the first step, and its shadow and its footprint at the input image have to be distinguished.

The second step selects the reference object from the image inputted through the first step and measures vertical lines connecting a roof corner for the reference object and a footprint corner corresponding to the roof corner and a shadow line connecting a shadow-line end point corresponding to the roof corner and a footprint corner corresponding to the roof corner.

The third step estimates the azimuth and the elevation angles of a camera and a light source at image acquisition time using a height of the reference object inputted through the second step, ground sampling distance, the reference object-related vertical line and shadow line information measured from the input image or estimates an elevation angle proportion constants replaceable of the elevation angles of the light source and the camera if the ground sampling distance of the image is unknown.

The fifth step adjusts a height value of an object for extracting 3-dimension information, and an adjustment of the height value may be performed by a way of setting an initial height value to 0 and incrementally increasing the height value.

The sixth step generates vertical lines and the virtual shadow of the object corresponding to a height value adjusted through the fifth step using azimuth and elevation angles or elevation angle proportion constants replaceable of the elevation angles of the camera and the light source at image acquisition time estimated through the third step, and projects the vertical lines and the virtual shadow generated onto the inputted image.

The seventh step determines if the vertical lines or virtual shadow projected through the sixth step matches against the vertical lines or shadow in the input image, and in a case of a mismatch, re-adjusts the height value of the object by repeating the fifth step procedure.

The eighth step determines an actual height of the object using the height adjusted through the fifth step when determined through the seventh step that the vertical lines or virtual shadow projected at the sixth step matches against the vertical lines or shadow in the image inputted through the first step, and extracts a footprint surface outline position of the object by parallel-moving the roof surface outline of the object according to vertical lines, and determines a position of the object at the input image through the footprint surface outline position.

As described above, a method by a shadow analysis from a single image without meta information according to the present invention has an effect extracting 3-dimension object information with inexpensive cost using only one image. Also, the present invention has an effect of employing various single high-resolution images available in public image maps for three-dimension object information extraction because the present invention can work without meta information.

In addition, the present invention has an effect of applying to various environment simulation fields, 3-dimension city model generation and update, 3-dimension map generation and update, digital map generation and update, and various fields required three-dimension object models or three-dimensional information of objects such as a real-world based computer games and maps for a navigation of an automobile, because the present invention can extract three-dimension information of objects using a single image without meta information.

BRIEF DESCRIPTION OF THE DRAWINGS

The objectives, features and advantages of the present invention will be more clearly understood from the following detailed description taken in conjunction with the accompanying drawings, in which.

DESCRIPTION OF THE PREFERRED EMBODIMENTS

Features and advantages of the present invention will be more clearly understood by the following detailed description of the present preferred embodiments by reference to the accompanying drawings. It is first noted that terms or words used herein should be construed as meanings or concepts corresponding with the technical sprit of the present invention, based on the principle that the inventor can appropriately define the concepts of the terms to best describe his own invention. Also, it should be understood that detailed descriptions of well-known functions and structures related to the present invention will be omitted so as not to unnecessarily obscure the important point of the present invention.

Figure 1:
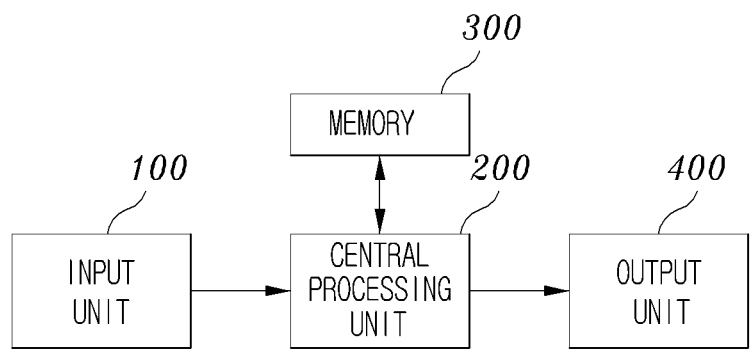
FIG. 1 is a hardware configuration for realizing the present invention.

FIG. 1 is a general computer construction in which the present invention is applied, configured by an input unit 100 for inputting with each kind of data from a user, a central processing unit 200 to perform a general function of the present invention based on data inputted through the input unit 100, a memory 300 for temporarily storing data necessary for an operation of the central processing unit 200 and an output unit 400 outputting a processing result of the central processing unit 200, wherein the output unit 400 may include several types such as monitors or printers.

The present invention performed with such a system will be described along with a flow diagram of FIG. 2.

First, in first step (S100), images devoid of meta information from image data of an object photographed at a satellite image or an airplane is input through the input unit 100.

Herein, the meta information includes a shooting date and a shooting region of a photographed image, a schematic position to a camera, an elevation angle and an azimuth of a camera, an elevation angle and an azimuth of a light source, and a ground sampling distance of the image. The present invention is characterized in that there is no need of meta information of the image because necessary information to extract object information from a single image is obtained from an image itself.

Next, in second step (S200), a reference object from an image inputted through the first step (S100) is selected, a vertical line and a shadow line of the reference object is measured from an image, and a height of the reference object is inputted.

Herein, the reference object must be selected with an object well identifiable of a shadow and a footprint surface corner of the object from an input image, a vertical line measured for the reference object means a straight line linking a roof corner of the reference object with the footprint corner corresponding to the roof corner, and a shadow line measured for the reference object means a straight line linking the shadow end point corresponding to the roof corner with the footprint corner corresponding to the roof corner.

Next, in third step (S300), performed using the central processing unit 200, azimuth and elevation angles of a camera and a light source at image photographing times are estimated using a height of the reference object inputted through the second step (S200) and the vertical line and the shadow line information of the reference object measured.

On the one hand, in a case of estimating an elevation angle of the camera and the light source, when a Ground Sampling Distance or spatial resolution of the image is unknown, elevation angle proportion constants replaceable of the elevation angles are estimated.

Next, in fourth step (S400), after information on azimuth and elevation angles of a camera and a light source at that photographing time is calculated through the third step (S300), a specific object to find a footprint surface position and a height of the object from the image inputted through the first step (S100) is selected and a roof surface outline of the selected object is extracted.

And the next, in fifth step (S500), a height value of the object selected at the fourth step is adjusted. Such an adjustment of a height value may be performed by a method of setting an initial height value to 0 and incrementally increasing height values.

Next, in sixth step (S600), vertical lines and a virtual shadow of the object corresponding to a height value adjusted through the fifth step (S500) are projected onto the input image.

That is, the sixth step (S600) generates the vertical lines and the virtual shadow of the object corresponding to an adjusted height value through the fifth step (S500) using azimuth and elevation angle information of a camera and a light source at image acquisition time estimated through the third step S300 or elevation angle proportion constants replaceable of the elevation angles, and projects vertical lines and the virtual shadow of the object onto the image inputted through the first step (S100).

Next, in the seventh step (S700), whether the projected the vertical lines or virtual shadow matches against the vertical lines or shadow of the input image is determined.

The seventh step (S700) checks if the vertical lines or virtual shadow projected through the sixth step (S600) matches against the vertical lines or shadow of the object in the image inputted through the first step (S100), and in a case of a mismatch, re-performs from a procedure of the fifth step (S500) in order to re-adjust a height value of the object.

Finally, the eighth step (S800) extracts a height of the object and a footprint surface outline position when the vertical lines or virtual shadow projected in the sixth step (S600) matches against the vertical lines or shadow of the input image.

That is, when determined through the seventh step (S700) that the vertical lines or virtual shadow projected at the sixth step (S600) matches against the vertical lines or shadow of the image inputted through the first step (S100), the eighth step (S800) determines an actual height of the object using the height adjusted through the fifth step (S500), extracts a footprint surface outline of the object by parallel-moving the roof surface outline of the object according to the vertical lines, and determines a position of the object in the image inputted through the first step (S100) using the footprint surface outline extracted.

Figure 3:
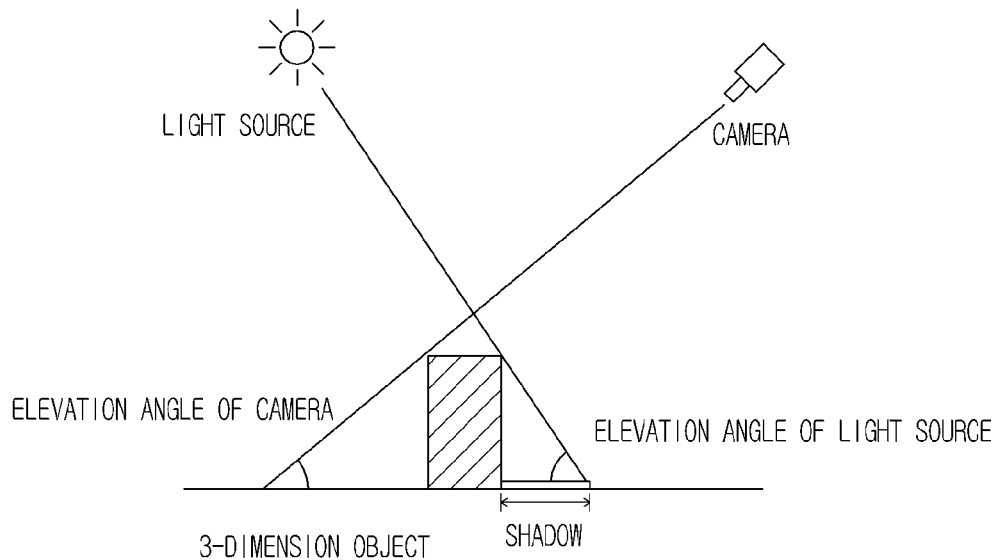
FIG. 3 is a diagram for describing a relationship between a shadow and a three-dimension object and elevation angles of a light source and a camera.
Figure 4:
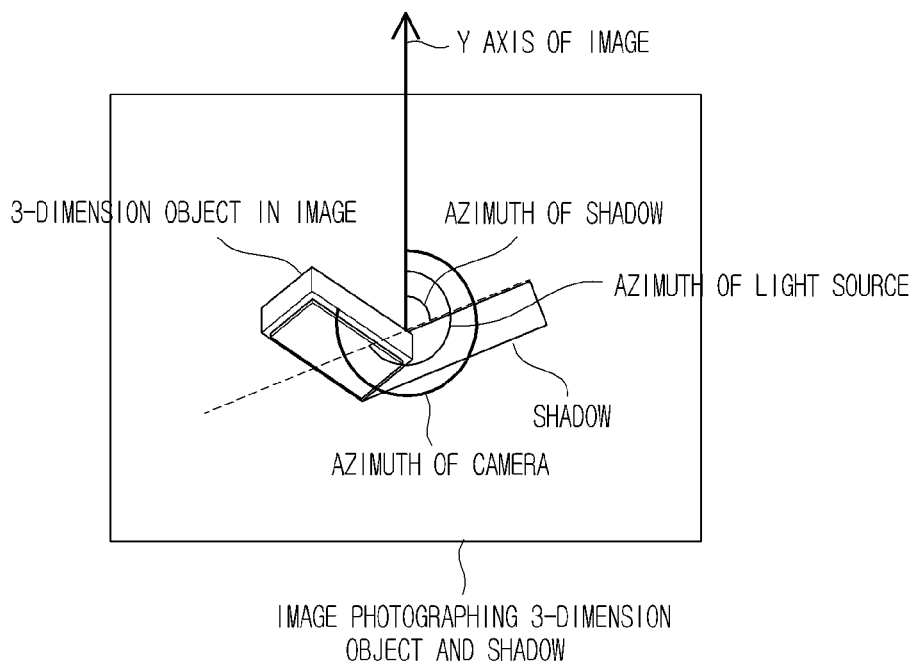
FIG. 4 is a diagram for describing a relationship between a shadow and a three-dimension object and azimuth angles of a light source and a camera indicated in an image.

FIG. 3 is a diagram for describing a relationship between elevation angles of a light source and a camera and a three-dimension object and a shadow, and FIG. 4 is a diagram for describing a relationship between azimuth angles of a camera and a light source and a 3-dimension object and a shadow indicated in an image.

Figure 2:
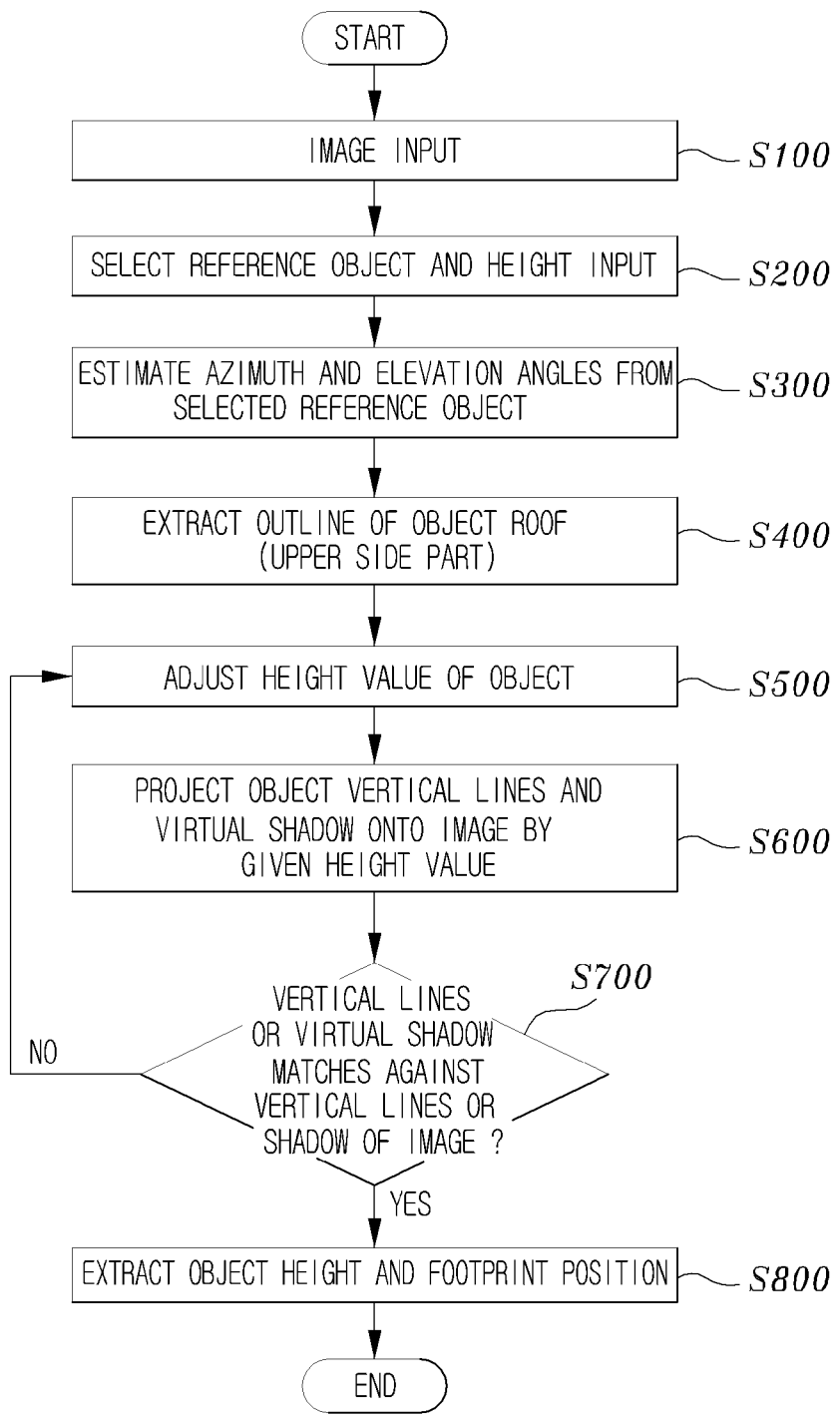
FIG. 2 is a flow diagram of a method of extracting 3-dimension object information by a shadow analysis from a single image without meta information according to the present invention.

The present invention, as shown in FIG. 1 and FIG. 2, performs a method of generating a virtual shadow and vertical lines of an object observable at an image and projecting it onto the image using a basic relationship of a light source, a camera, the object and a shadow at image acquisition time.

On the one hand, azimuth angles of a light source and a camera are estimated using an angle between a measured vertical line and shadow line of a reference object and an Y axis of an image, and elevation angles of the light source and the camera or elevation angle proportion constants replaceable of the elevation angles are estimated using a length of the vertical line and the shadow line of the reference object and a height value inputted for the reference object. Azimuth and elevation angle information of a light source and a camera estimated from a single image may be estimated using some different mode according to the type of an image and a photographing method.

A height inputted in the second step (S200 of FIG. 2) may use a height actually known by a user, or may use a height measured using an actual measurement device or a height known through information opened on the Internet, and a schematic height guessed by a user, for a reference object appointed by a user.

Herein, the above-described height adjustment incrementally adjusts a height value starting from 0 value, and thus vertical lines of an object is generated, and a footprint position of the object is extracted by parallel-moving an outline of the object roof along the vertical lines.

At this time, in a case a region projected with a virtual shadow corresponding to a given height has inclined or a physical object of a different height exists within that zone, a height of a corresponding object may be calculated by finding a slant degree of a projected zone or a height of another physical object.

Hereinafter, a basic principle for estimating azimuth and elevation angles of a camera and a light source or elevation angle proportion constants replacing the elevation angles in an image will be described. Furthermore, an example of a procedure extracting 3-dimension information of an object in an actual image using estimated azimuth and elevation angles or elevation angle proportion constants will be described.

Figure 5:
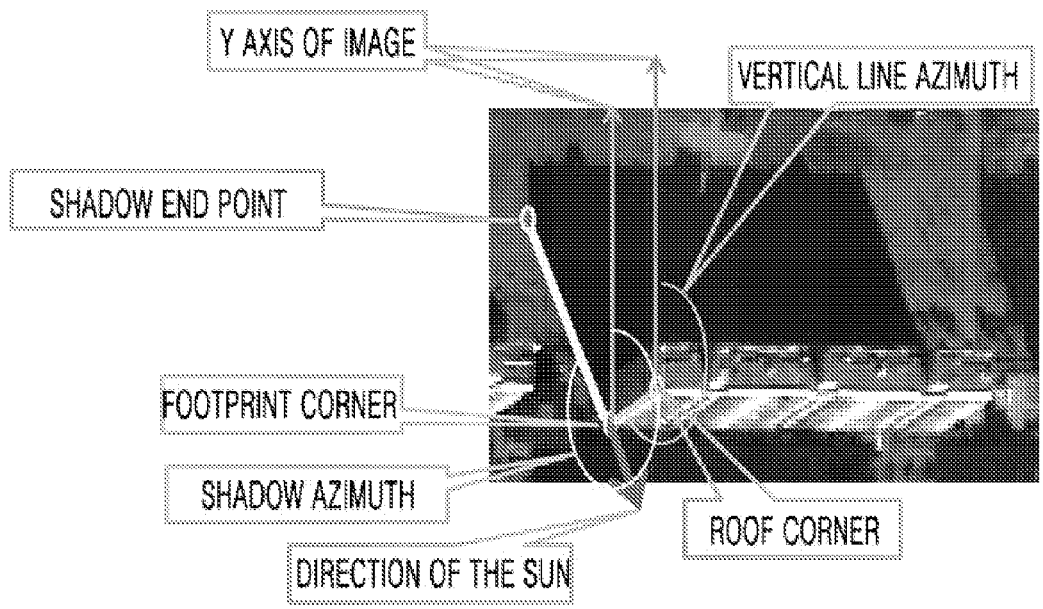
FIG. 5 is an exemplary diagram indicating a relationship between azimuth angles of a camera and a light source (the Sun) and an object in an image which has pushbroom geometry.
Figure 6:
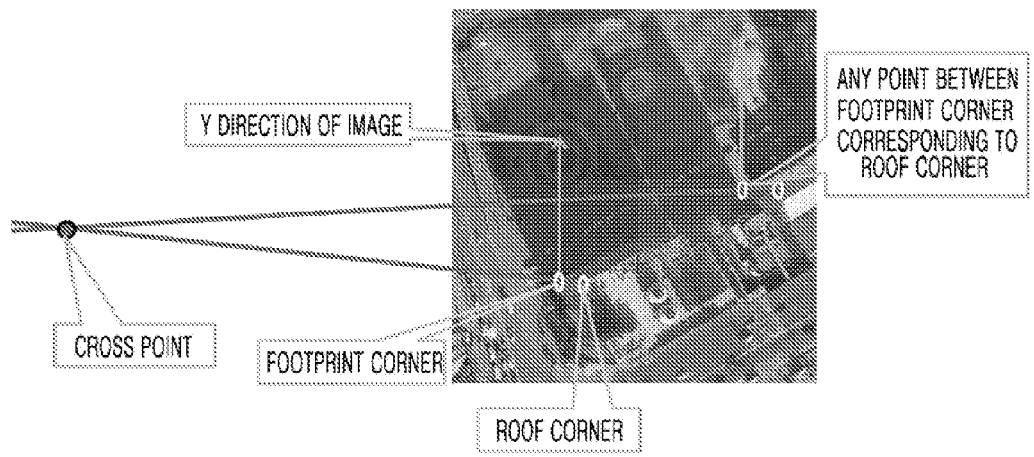
FIG. 6 is a diagram indicating a direction of an object vertical line in an image which has perspective geometry.

FIG. 5 is an exemplary diagram indicating a relationship between azimuth angles of an object and a camera and a light source (the Sun) in an image which has pushbroom geometry, and FIG. 6 is an exemplary diagram indicating an object vertical-line direction in an image which has perspective geometry.

As shown in FIG. 5, in a case of using the image of a pushbroom view, with respect to a Y direction of the image, a vertical-line azimuth of an object derived from a relationship with a vertical line connecting a roof corner to a footprint corner is shown.

From a vertical-line azimuth of the object, a camera azimuth at image acquisition time may be estimated, and at this time an actual camera azimuth is measured clockwise from a north base line. However the present invention assumed a Y direction of an image as the north.

Also, FIG. 5 shows a relationship between a shadow line connecting a shadow end point with a footprint corner and a Y direction of an image to be an azimuth angle of the shadow line. Herein, since a light source is placed in an opposite direction of a shadow, an azimuth angle of the light source may be estimated through such a relationship.

FIG. 6 shows how an azimuth angle of an object vertical line is determined, in a case of using an image of a perspective view. Since a vertical line of an object in such a perspective view is directed to a Principal point of the image, more than two of vertical lines are measured, and a point intersected with a measured vertical line is decided as a principal point. Herein, the principal point is a basis indicating a direction of all object vertical-lines in the image, and from this, an azimuth angle of the camera in each object may be calculated.

At this time, more than two crossed vertical lines may be selected at a same object, or may be selected from other objects.

An azimuth angle of a light source in an image of such perspective view is estimated using an identical method (see FIG. 5) to an image of the above-described pushbroom view.

Figure 7:
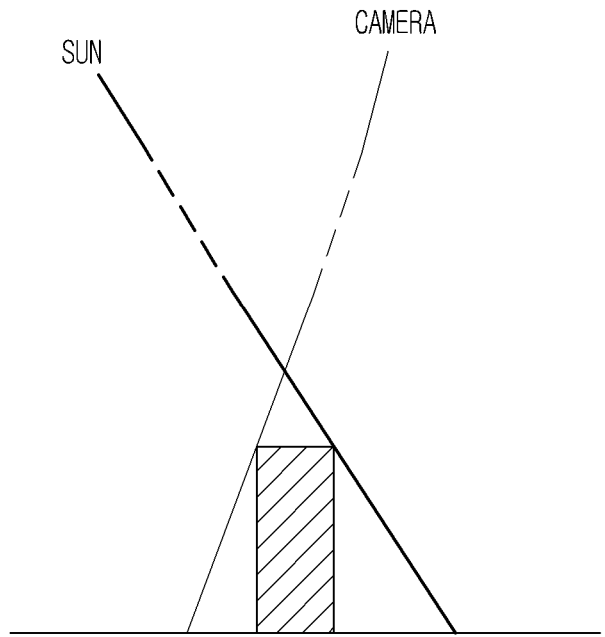
FIG. 7 is a diagram indicating a relationship between an object and elevation angles of a light source (the Sun) and a camera in an image which has pushbroom geometry.
Figure 8:
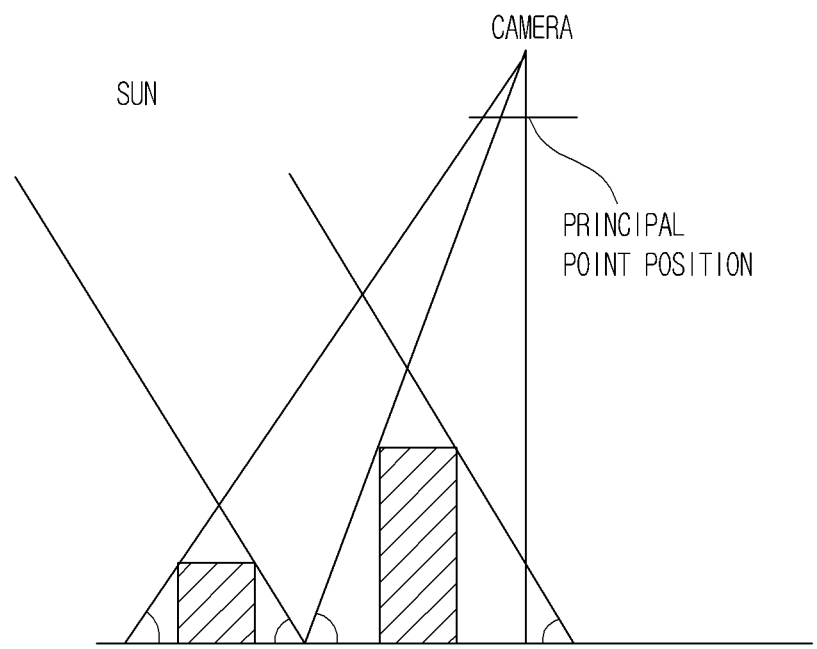
FIG. 8 is a diagram indicating a relationship between an object and elevation angles of a light source (the Sun) and a camera in an image which has perspective geometry.

FIG. 7 is a diagram indicating a relationship between elevation angles of a light source (the Sun) and a camera and an object in an image of a pushbroom view, and FIG. 8 is a diagram indicating a relationship between an elevation angle of a light source (the Sun) in an image of a perspective view.

FIG. 7 presents a basic principle needed to estimate elevation angles of a light source and a camera in a case of an image of a pushbroom view. An image of a pushbroom view is such that an elevation angle of a camera for all objects in one image may be the same, and also in a case of an elevation angle of a light source (the Sun), since a light source (the Sun) is far from the earth surface, it can be assumed that an elevation angle of a camera for all objects in one image is the same.

Thus, elevation angles of a reference object may be estimated using relationship shown in FIG. 7 and the following Equation 1 and Equation 2.

FIG. 8 presents a basic principle for estimating elevation angles of a light source and a camera in an image of a perspective view. In a case of an image of a perspective view, an elevation angle of a camera to each object in the image may have a different value. A camera elevation angle in the image of a perspective view having such characteristics is on the basis of a principal point of the image, and it may be computed through a general method using a distance between the principal point and a roof corner point of each object, etc.

Since in an image of such a perspective view, a light source (the Sun) is positioned at a greatly farther place, it can be assumed that an elevation angle and an azimuth of the light source are the same in all objects within one image.

On the one hand, an elevation angle of a light source has a fundamental characteristic identical to FIG. 7 and FIG. 8 depending on each photographing mode and the type of an image, and that of the present invention may be computed using the following Equation 1 from a basic characteristic of FIG. 7 and FIG. 8 and a height of a reference object inputted by a user.

$$L_{shadow} = H \times \frac{\tan(\theta_{sun})}{GSD} \qquad \text{[Equation 1]}$$

Where, $L_{shadow}$ denotes a length on an image coordinate of a shadow line connecting a shadow end point corresponding to a footprint corner of the reference object, H denotes the reference object height inputted by a user, $\theta_{sun}$ being an estimated elevation angle of a light source, and GSD denotes a ground sampling distance of the image.

At this time, if the GSD is not known, $$\frac{\tan(\theta_{sun})}{GSD}$$

is defined as an elevation angle proportion constant replacing an elevation angle of a light source, and this value is calculated.

On the one hand, an elevation angle of a camera has a basic characteristic like FIG. 7 and FIG. 8 depending on each photographing method and the type of an image, that of the present invention may be calculated using the following Equation 2 from a basic characteristic of FIG. 7 and FIG. 8 and a height of a reference object inputted by a user.

$$L_{vertical} = H \times \frac{\tan(\theta_{camera})}{GSD} \qquad \text{[Equation 2]}$$

Where, $L_{vertical}$ denotes a length on an image coordinate of a vertical line connecting a roof corner to a footprint corner of the reference object, H denotes the reference object height inputted by a user, $\theta_{camera}$ being an estimated elevation angle of a camera, and GSD denotes a ground sampling distance of the image.

At this time, if the GSD is not known, $$\frac{\tan(\theta_{camera})}{GSD}$$

is defined as an elevation angle proportion constant replacing an elevation angle of a light source, and this value is calculated.

Hereinafter, various exemplary diagrams about objects extracted using a method of extracting a 3-dimension object information through a shadow analysis in a single image without meta information according to the present invention will be described.

Figure 9:
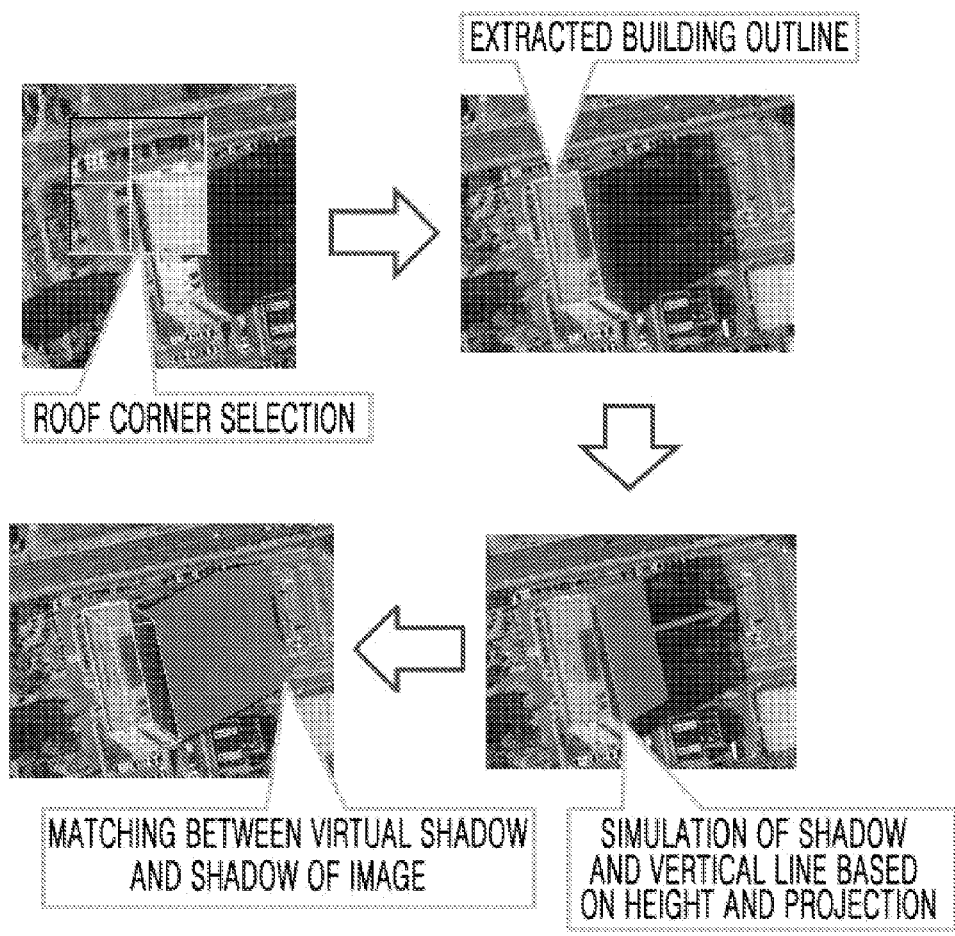
FIG. 9 is an exemplary diagram showing how an object is practically extracted from one image using information such as azimuth and elevation angles of a light source and a camera estimated by a method according to the present invention.

FIG. 9 is an exemplary diagram showing how an object is actually extracted from an image using azimuth and elevation angles of a camera and a light source estimated using a method according to the present invention.

Figure 10:
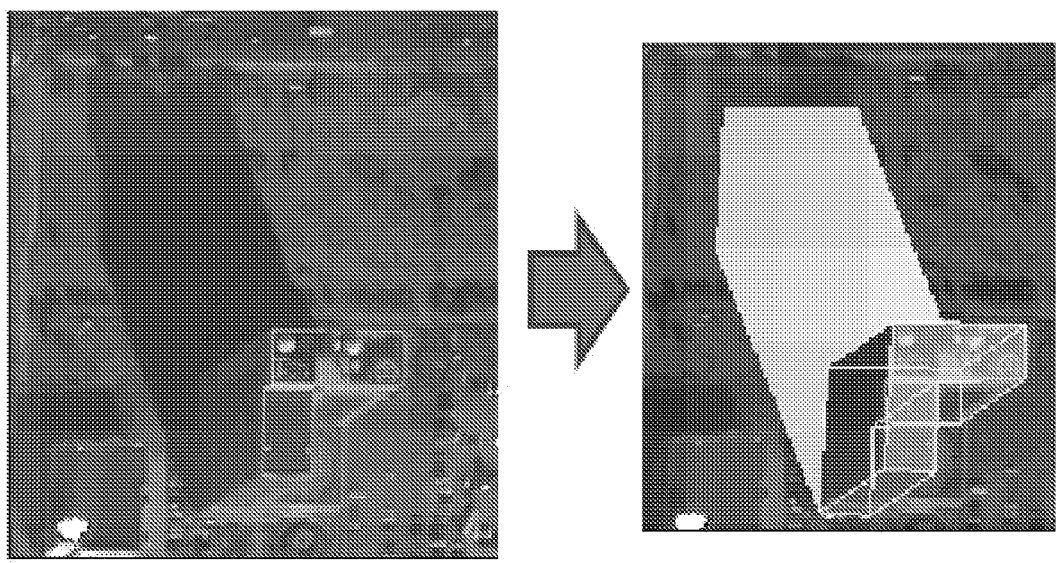
FIG. 10 is an exemplary diagram showing an aspect of an object (building) extracted from a satellite image of pushbroom view by the method according to the present invention.
Figure 11:
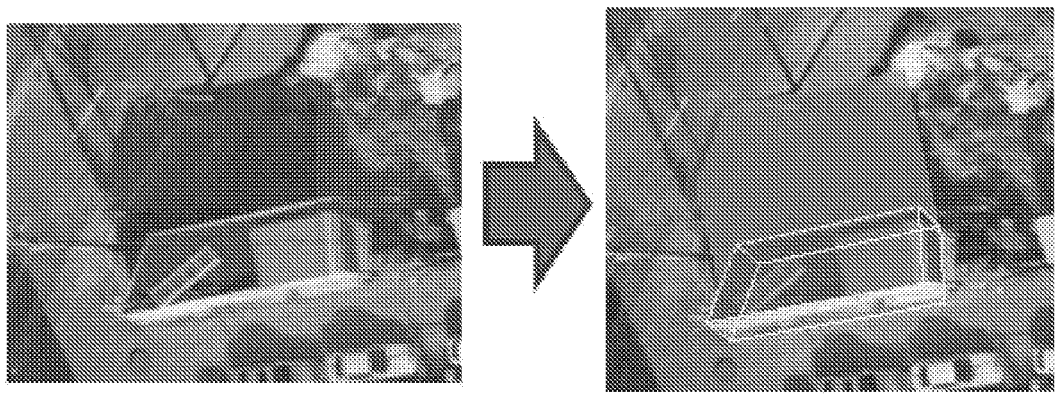
FIG. 11 is an exemplary diagram showing an aspect of an object (building) extracted from a aerial image of perspective view by the present invention.
Figure 12:
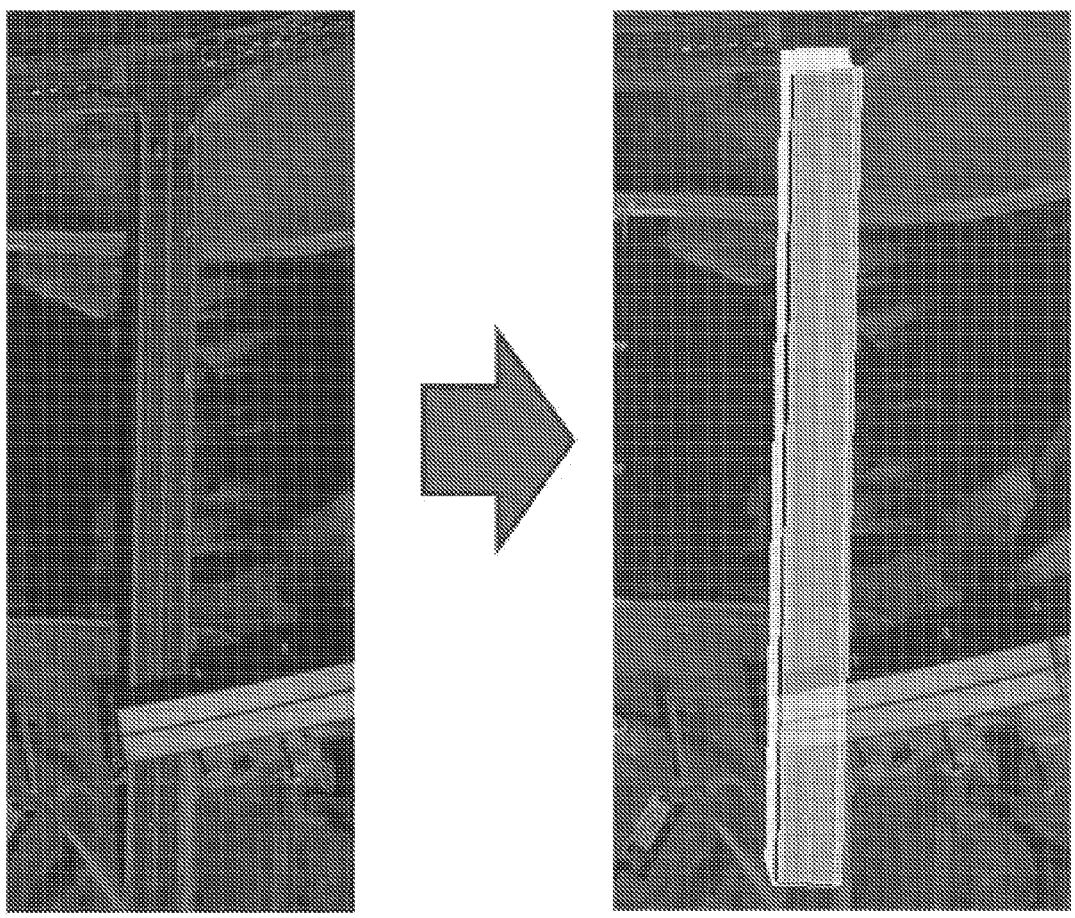
FIG. 12 is an exemplary diagram showing an aspect of an object (road and bridge) extracted from satellite image of pushbroom view by the present invention.

FIG. 10 is an exemplary diagram showing an aspect of an object (building) extracted from a satellite image of a pushbroom view by the method according to the present invention, FIG. 11 is an exemplary diagram showing an aspect of an object (building) extracted from an aerial photography of a perspective view, and FIG. 12 is an exemplary diagram showing an aspect of an object (road and bridge) extracted from a satellite image of a pushbroom view.

Figure 13:
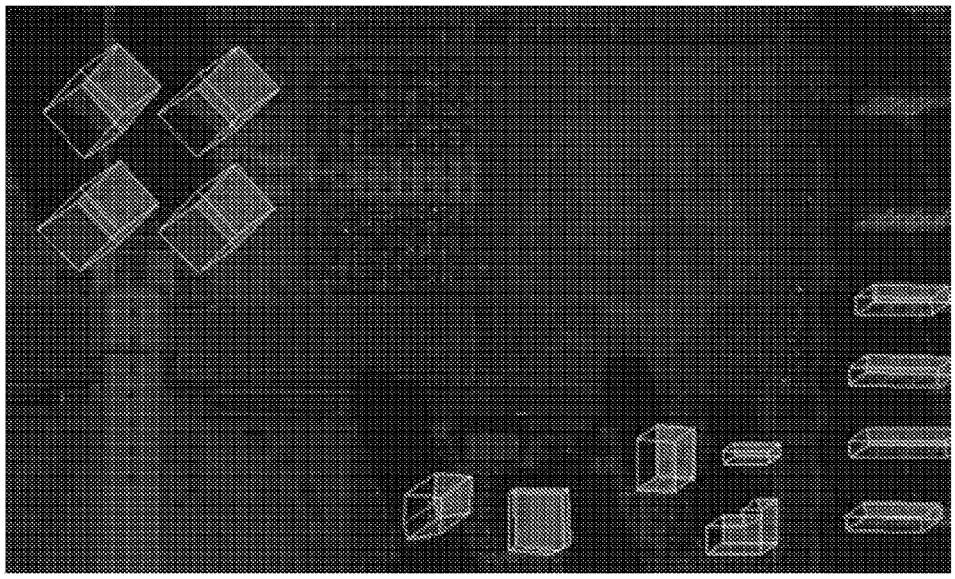
FIG. 13 is an exemplary diagram of extracting 3-dimension information of objects from a satellite image of a pushbroom view by the method according to the present invention and showing 3-dimension models generated by this.
Figure 13:
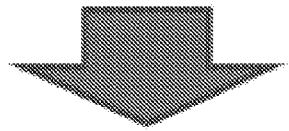
Figure 13:

FIG. 13 is an exemplary diagram showing objects extracted from a satellite image of a pushbroom view by the method according to the present invention, and showing three-dimension models generated by this.

Like various embodiments shown in FIGS. 9 through 13, the present invention can be applied to various images with meta information or without it such as satellite images, aerial images, image maps in internet and etc. And the present invention can extract 3-dimension information from these images without meta information for terrain analysis, cartography, townscape analysis, 3-dimension object modeling, the environment simulation fields and etc.

Hereinafter, an experiment result of a method of extracting 3-dimension object information by a shadow analysis from a single image without meta information according to the present invention will be explained.

Figure 14:
FIG. 14 is a diagram indicating an image used in an experiment of a method according to the present invention.

The present experiment has been performed using an image of the same region extracted from IKONOS image and Google earth, and the used image is the same one as shown in FIG. 14.

In FIG. 14, the upper figure shows a part of an IKONOS image of Daejeon region used in the experiment. The IKONOS image is the image of 'Standard Geometrically Corrected level', taken in the year of 2002, and azimuth and elevation angles of the IKONOS sensor and the sun in meta information are indicated in the following Table 1.

TABLE 1

| | Image IKONOS satellite image | | |
| | | Reference object | |
| | Meta information | Government complex Daejeon | Any apartment |
| --- | --- | --- | --- |
| Base height | — | 91.9 m | 40 m |
| Sensor azimuth | 234.87° | 237.65° | 235.30° |
| Sun azimuth | 159.24° | 160.21° | 159.67° |

TABLE 1-continued

| | Image IKONOS satellite image | | |
| | | Reference object | |
| | Meta information | Government complex Daejeon | Any apartment |
| --- | --- | --- | --- |
| Sensor elevation angle | 68.44° | 68.87° | 68.43° |
| Sun elevation angle | 35.87° | 37.18° | 34.78° |

The lower figure of FIG. 14 is one extracting Daejeon region at Google earth. When Daejeon region is extracted at Google earth, it is configured to visually have a higher spatial resolution. A circle part in FIG. 14 is one representing a used building in a case meta information is not used.

In the present invention, reference height values of buildings are extracted from a stereo IKONOS image by sensor modeling technique. For this, used ground control points (GCPs) are actually measured by GPS measurement devices at Daejeon region covered by IKONOS image. In the present invention, 10 GCPs are used for each image.

A digital elevation model (DEM) used for calculating a horizontal position of a building model generated from IKONOS image by the present invention is generated using ArcMap from 1:5,000 digital maps and a spatial resolution of the DEM is 9.05 m.

An experiment method of the present invention, extracts building information with an existing method using meta information from IKONOS image and extracts building information by the proposed method without the meta information, and for each case, a horizontal position and a height accuracy are verified. Also, by the application of a method according to the present invention to a Google earth image without meta information, building information is extracted and a height accuracy of a building is verified. And, after a three-dimension building model is generated using extracted building information, the difference is compared with a bare eye.

To verify accuracy of a method according to the present invention, it is supposed that building heights extracted from stereo IKONOS image by sensor modeling technique and horizontal position of buildings extracted from 1:1000 digital maps are true values.

A method according to the present invention needs a reference building for estimating an azimuth and an elevation angle by a height value inputted. For the experiment, the reference buildings selected are Government Complex Daejeon and any apartment in the image. (A circular section of FIG. 14)

Height of Government Complex Daejeon is known as 91.9 m (Government complex management office, 2009), thus it is used.

Any apartment in the vicinity is used to experiment of the method using azimuth and elevation angles estimated by a height which user expects. The present experiment has set a schematic height of the any apartment to 40 m and the method according to the present invention is applied.

Table 1 and Table 2 describe azimuth and elevation angles estimated by a method of the present invention. As illustrated in the above Table 1, it is shown that azimuth angles of the sun and the sensor in meta information of an actual IKONOS satellite image is different with azimuth angles calculated using the reference building of an IKONOS satellite image.

TABLE 2

| | Image Image extracted at Google earth Reference object | | |
|---|---|---|---|
| | Government complex Daejeon I | Government complex Daejeon II | Any apartment |
| Base height | 91.9 m | 88.8 m | 40 m |
| Sensor azimuth | 192.87° | 192.87° | 101.30° |
| Sun azimuth | 169.19° | 169.19° | 168.69° |

TABLE 2-continued

| | Image Image extracted at Google earth Reference object | | |
|---|---|---|---|
| | Government complex Daejeon I | Government complex Daejeon II | Any apartment |
| Sensor elevation angle | 68.66° | 67.98° | 69.07° |
| Sun elevation angle | 30.70° | 29.84° | 30.30° |

Because azimuth angles extracted by a method according to the present invention are on the basis of a Y axis of an image, it is surmised to show such a difference. In the table, sensor elevation angles are similar to each other, but regarding elevation angles of the sun, an elevation angle of Government Complex Daejeon is differently calculated.

Such difference of the elevation angle estimated may be caused by a shadow length difference occurring according to bends of an actual ground and position accuracy of pixels selected for calculating the length of a shadow.

On the one hand, for a Google earth image, an experiment is performed by Government Complex Daejeon I, Government Complex Daejeon II, and any apartment as the reference building. (Table 2)

At this time, the height of Government Complex Daejeon I is the height (91.9 m) searched in the internet, and the height of Government Complex Daejeon II is the height (88.8 m) extracted from the stereo IKONOS image. A difference between the height searched in the internet and the height extracted from the stereo image exists, because a height of a helicopter landing field on Government Complex Daejeon is not included in the height extracted by the stereo image.

Table 3 shows a vertical (building height) accuracy of three-dimension building models generated by the method using meta information, using Government Complex Daejeon as a reference building and using any apartment as a reference building.

TABLE 3

| | Extracted building height | | | | | | |
|---|---|---|---|---|---|---|---|
| | Base height Stereo | Meta information | Government Complex | Apartment | Error | | |
| ID | (S) | (M) | (D) | (A) | s – M | S – D | s – A |
| 1 | 19.072 | 21 | 21 | 20 | −1.927 | −1.927 | −0.927 |
| 2 | 15.903 | 15 | 18 | 16 | 0.903 | −2.906 | −0.096 |
| 3 | 28.593 | 27 | 29 | 26 | 1.593 | −0.406 | 2.593 |
| 4 | 88.802 | 90 | 93 | 87 | −1.197 | −4.197 | 1.802 |
| 5 | 42.521 | 43 | 45 | 41 | −0.478 | −2.478 | 1.521 |
| 6 | 40.594 | 43 | 45 | 41 | −2.406 | −4.406 | −0.406 |
| 7 | 36.311 | 36 | 35 | 36 | 0.311 | 1.311 | 0.311 |
| 8 | 89.322 | 90 | 91 | 87 | −0.677 | −1.677 | 2.322 |
| 9 | 46.788 | 46 | 48 | 44 | 0.788 | −1.211 | 2.788 |
| 10 | 28.173 | 27 | 27 | 25 | 1.173 | 1.173 | 3.173 |
| 11 | 95.520 | 96 | 98 | 95 | −0.479 | −2.479 | 0.520 |
| 12 | 81.182 | 83 | 85 | 79 | −1.818 | −3.818 | 2.182 |
| 13 | 17.192 | 18 | 18 | 17 | −0.807 | −0.807 | 0.192 |
| 14 | 25.329 | 27 | 25 | 23 | −1.670 | 0.329 | 2.329 |
| 15 | 15.352 | 15 | 16 | 14 | 0.352 | −0.647 | 1.352 |
| 16 | 42.525 | 45 | 46 | 42 | −2.474 | −3.474 | 0.525 |
| 17 | 14.844 | 15 | 16 | 14 | −0.155 | −1.155 | 0.844 |
| 18 | 17.181 | 17 | 17 | 17 | 0.181 | 0.181 | 0.181 |
| 19 | 15.768 | 16 | 16 | 14 | −0.231 | −0.231 | 1.768 |
| 20 | 43.950 | 43 | 45 | 41 | 0.950 | −1.049 | 2.950 |
| | | | RMSE (m) | | 1.283 | 2.239 | 1.804 |

A building height used as a reference height in the above Table 3 is one extracted using a direct linear transformation (DLT) established using GCPs from the stereo IKONOS satellite image.

That is, a difference between a Z coordinate extracted by DLT from a building roof corner and a Z coordinate extracted from a surface of the building is determined as a reference height of the building. DLT model establishment accuracy is verified using check points of about 3 for each image, and as a result, a RMS error of the DLT model is about 1 pixel for each image.

As shown in the Table 3, a total of 20 buildings are selected for a height accuracy verification of building models generated.

In Table 3, a stereo (S) shows heights extracted from the stereo IKONOS image, meta information (M) shows heights extracted using a given meta information, Government Complex (D) is heights extracted by the method using Government Complex Daejeon (91.9 m) as the reference building, and an apartment (A) is a height extracted by the method using any apartment (40 m) as the reference building.

And, S-M, S-D, and S-A each indicates results subtracted heights of 'M', height of 'D' and height of 'A' from a height extracted from the stereo image.

As shown in the Table 3, an RMS error of building heights extracted by the method using Government Complex as the reference building is the biggest, and the greatest error (−4.406 m) existed in 'S-D'.

The error (S-D) may be influenced by the height of the helicopter landing field. A result of the method using any apartment has a relatively high accuracy. That may infer a height of the apartment given by user was similar to a height of an actual apartment.

After the above experiment, the height of any apartment extracted from the stereo image turned out about 43 m. In Table 3, a case in which guessed height is applied shows a similar pattern to the building height pattern extracted by the method using meta information.

Horizontal position accuracy for 5 buildings among 20 buildings is verified. Table 4 shows a result which is compared 2 footprint corner coordinates with coordinates corresponded to the footprint corners in 1:1,000 digital maps.

'R-M', 'R-D', and 'R-A' in 'Errors' of the Table 4 are results subtracted 'M', 'D' and 'A' from a construction coordinate of the digital maps.

As shown in the Table 4, a horizon position RMS error for 5 buildings is less than 3 m in the IKONOS image, which has 1 m spatial resolution. This may indicate that the buildings which have relatively accurate horizon position can be extracted by the proposed method. Comparing the above horizontal/vertical accuracy, it can be known that a three-dimension building model generated by the method using information calculated from a guessed height without meta information is relatively precise. Also, a relative height difference pattern between 3-dimension building models seems to be similar in all cases.

TABLE 4

| | | Horizontal position coordinate of building corner (TM) | | | | | | |
|---|---|---|---|---|---|---|---|---|
| | | Digital | Meta information | Government Complex | ApartMent | Error | | |
| ID | | Map(R) | (M) | (D) | (A) | R − M | R − D | R − A |
| 4 | X1 | 234430.43 | 234428.28 | 234427.44 | 234430.52 | 2.15 | 2.99 | −0.09 |
| | Y1 | 317821.09 | 317824.06 | 317824.06 | 317822.66 | −2.97 | −1.57 | −2.29 |
| | X2 | 234400.67 | 234399.70 | 234397.83 | 234399.92 | 0.97 | 2.84 | 0.75 |
| | Y2 | 317851.11 | 317852.50 | 317853.09 | 317852.78 | −1.39 | −1.98 | −1.67 |
| 5 | X1 | 233951.90 | 233948.42 | 233947.81 | 233949.20 | 3.48 | 4.09 | 2.7 |
| | Y1 | 318231.32 | 318232.97 | 318233.16 | 318232.25 | −1.65 | −1.84 | −0.93 |
| | X2 | 233863.88 | 233861.05 | 233860.45 | 233861.81 | 2.83 | 3.43 | 2.07 |
| | Y2 | 318243.57 | 318244.09 | 318243.25 | 318243.34 | −0.52 | 0.32 | 0.23 |
| 7 | X1 | 233947.11 | 233945.64 | 233945.00 | 233944.77 | 1.47 | 2.11 | 2.34 |
| | Y1 | 318180.35 | 318182.34 | 318183.03 | 318181.16 | −1.99 | −2.68 | −0.81 |
| | X2 | 233859.50 | 233857.28 | 233857.63 | 233857.36 | 2.22 | 1.87 | 2.44 |
| | Y2 | 318192.37 | 318192.44 | 318194.16 | 318193.28 | −0.07 | −1.79 | −0.91 |
| 8 | X1 | 234545.17 | 234543.02 | 234542.78 | 234544.23 | 2.15 | 2.39 | 0.94 |
| | Y1 | 317935.75 | 317937.50 | 317938.53 | 317937.78 | −1.75 | −2.78 | −2.03 |
| | X2 | 234515.27 | 234513.39 | 234513.16 | 234514.58 | 1.88 | 2.11 | 0.69 |
| | Y2 | 317965.6 | 317966.91 | 317967.94 | 317968.19 | −1.31 | −2.34 | −2.59 |
| 20 | X1 | 235015.97 | 235013.41 | 235012.81 | 235014.17 | 2.56 | 3.16 | 1.8 |
| | Y1 | 317372.9 | 317373.81 | 317373.81 | 317373.94 | −0.76 | −0.91 | −1.04 |
| | X2 | 235073.09 | 235070.47 | 235068.88 | 235070.25 | 2.62 | 4.21 | 2.84 |
| | Y2 | 317373.52 | 317373.84 | 317374 | 317373.09 | −0.32 | −0.48 | 0.43 |
| | | | RMSE (m) | | | 2.01 | 2.57 | 1.73 |

An 'ID' in the above Table 4 corresponds to an 'ID' of the Table 3. x1, y1, x2, y2 each indicates x, y coordinates of one corner and x, y coordinates of another corner, and a digital map (R) shows a footprint corner (horizontal position) coordinate of a building on the 1:1000 digital maps. At this time, the digital maps are used TM coordinates system of Bessel Ellipsoid, so horizontal position coordinates of the buildings are all transformed to the TM coordinates.

However, errors of several m are shown, and a cause of such errors is surmised to be an error included in a measured length of a building vertical-line or of a shadow line when calculating an elevation angle, etc. in a reference building, an error occurring in selection of a building roof corner, and an error occurring when a height of an actual ground is not flat.

The following Table 5 shows height accuracy of a building model generated in Google earth image.

TABLE 5

| | | Extracted building height | | | | | | |
|---|---|---|---|---|---|---|---|---|
| | Base Height | Government CompLex | GovernMent CompLex | ApartMent | Error | | |
| ID | Stereo (S) | (C) | (D) | (A) | S − C | S − D | S − A |
| 1 | 19.072 | 19 | 19 | 19 | 0.072 | 0.072 | 0.072 |
| 3 | 28.593 | 27 | 29 | 27 | 1.593 | −0.406 | 1.593 |
| 4 | 88.802 | 88 | 92 | 91 | 0.802 | −3.197 | −2.197 |
| 5 | 42.521 | 43 | 44 | 44 | −0.478 | −1.478 | −1.478 |
| 6 | 40.594 | 44 | 45 | 44 | −3.406 | −4.406 | −3.406 |
| 7 | 36.311 | 35 | 34 | 33 | 1.311 | 2.311 | 3.311 |
| 8 | 89.322 | 89 | 94 | 90 | 0.322 | −4.677 | −0.677 |
| 9 | 46.788 | 45 | 49 | 43 | 1.788 | −2.211 | 3.788 |
| 10 | 28.173 | 29 | 30 | 28 | −0.826 | −1.826 | 0.173 |

TABLE 5-continued

| | | Extracted building height | | | | | |
|---|---|---|---|---|---|---|---|
| | Base Height | Government CompLex | GovernMent CompLex | ApartMent | Error | | |
| ID | Stereo (S) | (C) | (D) | (A) | S − C | S − D | S − A |
| 11 | 95.520 | 94 | 91 | 92 | 1.520 | 4.520 | 3.520 |
| 12 | 81.182 | 82 | 85 | 79 | −0.818 | −3.818 | 2.182 |
| 14 | 25.329 | 23 | 22 | 24 | 2.329 | 3.329 | 1.329 |
| 15 | 15.352 | 14 | 15 | 15 | 1.352 | 0.352 | 0.352 |
| 16 | 42.525 | 44 | 39 | 41 | −1.474 | 3.525 | 1.525 |
| 18 | 17.181 | 18 | 17 | 16 | −0.818 | 0.181 | 1.181 |
| 19 | 15.768 | 18 | 19 | 18 | −2.231 | −3.231 | −2.231 |
| 20 | 43.950 | 43 | 44 | 43 | 0.950 | −0.049 | 0.950 |
| | | RMSE (m) | | | 1.574 | 2.921 | 2.174 |

In the above Table 5, Government Complex (C) is building heights extracted by the method using Government Complex Daejeon height, 88.8 m extracted from the stereo IKONOS image, Government Complex (D) shows building heights extracted by the method using Government Complex Daejeon height, 91.9 m.

Table 5 shows an error for a total of 17 buildings, and a building ID corresponds to the Table 3.

Building 'ID's not existing in here are a construction not included in Google earth image but included in IKONOS image. As shown in the above result, a relative height pattern between buildings is all similar. On the one hand, in the case of Google earth image, a range of the extracted image is small, so that GCPs to establish a sensor model are not enough and thus a horizontal position error is not recognized.

Figure 15:
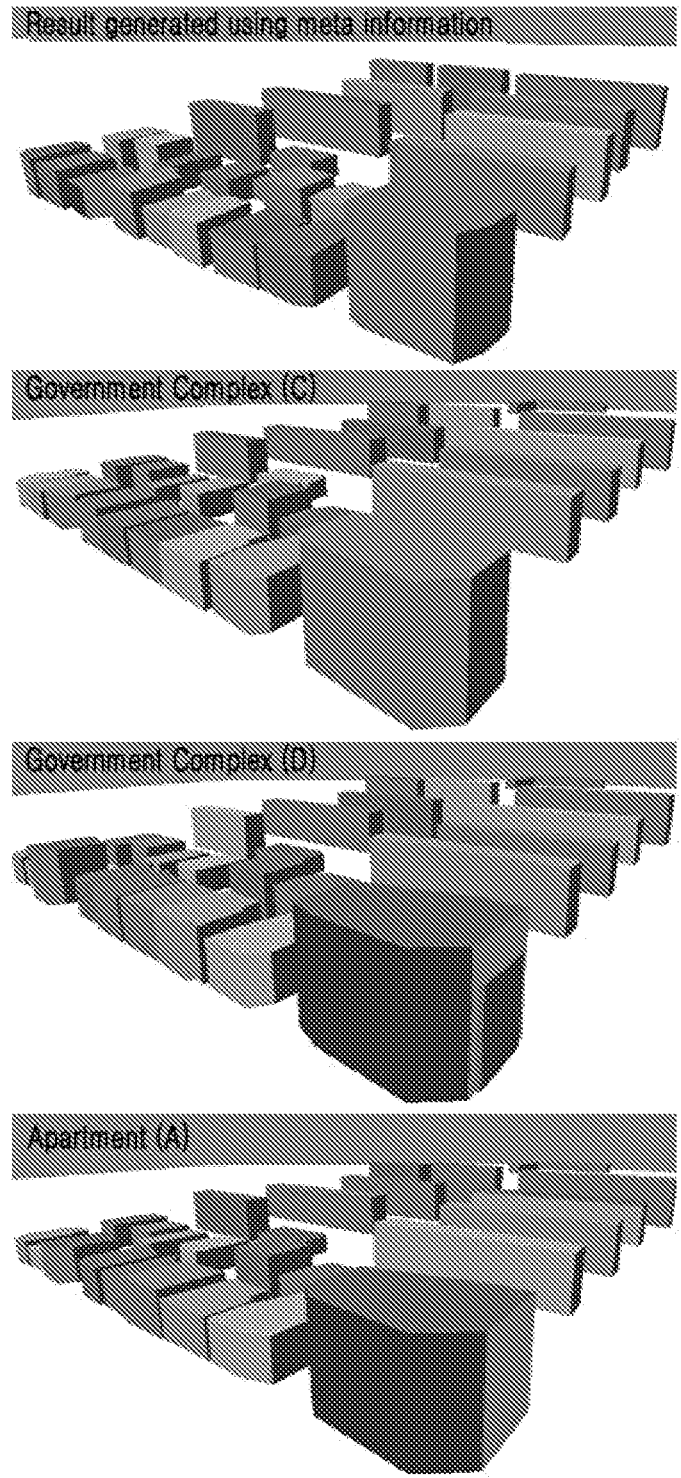
FIG. 15 is a diagram indicating a building model generated using meta information and IKONOS image and a building model generated according to C, D, A case of Table 5.

FIG. 15 shows building models generated by the method from the IKONOS image with meta information and building models generated according to a case of C, D, and A of the above Table 5.

In Table 15, it can be confirmed that a relative height of building models generated according to each case is visually similar. That is, it indicates that building models visually having a height pattern similar to a real world can be generated by the method without meta information.

As described above, an extraction method of 3-dimension object information by a shadow analysis from a single image without meta information according to the present invention has been described with reference to the exemplary drawings, but it is obvious that the invention is not limited to embodiments and drawings disclosed in the specification and various modifications by a person in the art can be made within a technical scope of the present invention.

What is claimed is:

1. A computer implemented three-dimension object information extraction method by a shadow analysis from a single image without meta information, comprising:
a first step of inputting a single image without meta information through an input unit;
a second step of selecting a reference object from the image inputted through the input unit, measuring a vertical line and a shadow line relative to the reference object from the input image and inputting a height of the reference object performed using a central processing unit;
a third step of estimating azimuth angles of a camera and a light source and elevation angles or elevation angle proportion constants, that can replace the elevation angles, of a camera and a light source at image acquisition time using vertical-line and shadow-line information of the reference object measured from the input image and the height of the reference object performed using the central processing unit;
a fourth step of selecting a specific object for finding a footprint position and the height of the object from the inputted image and extracting a roof surface outline of the selected object performed using the central processing unit;
a fifth step of adjusting a height value of the object selected performed using the central processing unit;
a sixth step of projecting a vertical line and a virtual shadow of the object corresponding to a height value adjusted through the fifth step onto the input image performed using the central processing unit;
a seventh step of determining if the vertical lines or virtual shadow projected through the sixth step matches against the vertical lines or shadow of the input image performed using the central processing unit; and
an eighth step of extracting a height and a footprint surface outline position of the object selected, when determined that the vertical lines of virtual shadow projected through the sixth step matches against the vertical lines or shadow of the image inputted through the seventh step performed using the central processing unit.

2. The object information extraction method as set forth in claim 1, wherein the second step selects the reference object from an image inputted through the first step and measures a vertical line connecting a roof corner of the reference object and a footprint corner corresponding to the roof corner and a shadow line connecting a shadow-line end point corresponding to the roof corner and a footprint corner corresponding to the roof corner.

3. The object information extraction method as set forth in claim 1, wherein, in the third step, azimuth angles of a camera and a light source at image acquisition time are estimated using vertical line and shadow line, elevation angles of the light source and the camera at that image acquisition time are estimated using a height of the reference object inputted through the second step, ground sampling distance of the image, the vertical line and the shadow line information of the reference object measured from the input image.

4. The object information extraction method as set forth in claim 1, wherein the sixth step generates a vertical line and a virtual shadow of the object corresponding to a height value adjusted through the fifth step using azimuth and elevation angles or elevation angle proportion constants replaceable of the elevation angles of the camera and the light source at image acquisition time estimated through the third step, and projects a vertical line and virtual shadow of the object onto the input image.

5. The object information extraction method as set forth in claim 1, wherein the seventh step determines whether the vertical lines or virtual shadow projected through the sixth step matches against the vertical lines of shadow of the inputted image, and in a case of a mismatch, re-adjusts a height value of the object by repeating the fifth step procedure.

6. The object information extraction method as set forth in claim 1, wherein the eighth step extracts a height of the object adjusted through the fifth step and determines it as an actual height of the object when determined through the seventh step that the vertical lines or virtual shadow projected at the sixth step matches against the vertical lines or shadow of the image inputted through the first step, and extracts a footprint surface outline position of the object by parallel-moving a roof surface outline of the object according to a vertical line, and determines a position of the object in the input image through the footprint outline position extracted.

7. The object information extraction method as set forth in claim 1, wherein, in the third step, elevation angle proportion constants replaceable of the elevation angles of the light source and the camera are estimated if ground sampling distance of the image is unknown.

\* \* \* \* \*